Apr. 24, 1923.

P. M. G. TOULON 1,452,666

DEVICE FOR THE COOLING OF ELECTRIC APPARATUS BY THE CIRCULATION
OF LIQUID THROUGH THE CONDUCTORS

Filed May 2, 1922

Inventor
P. M. G. Toulon,
By Marks&Clerk
Attys.

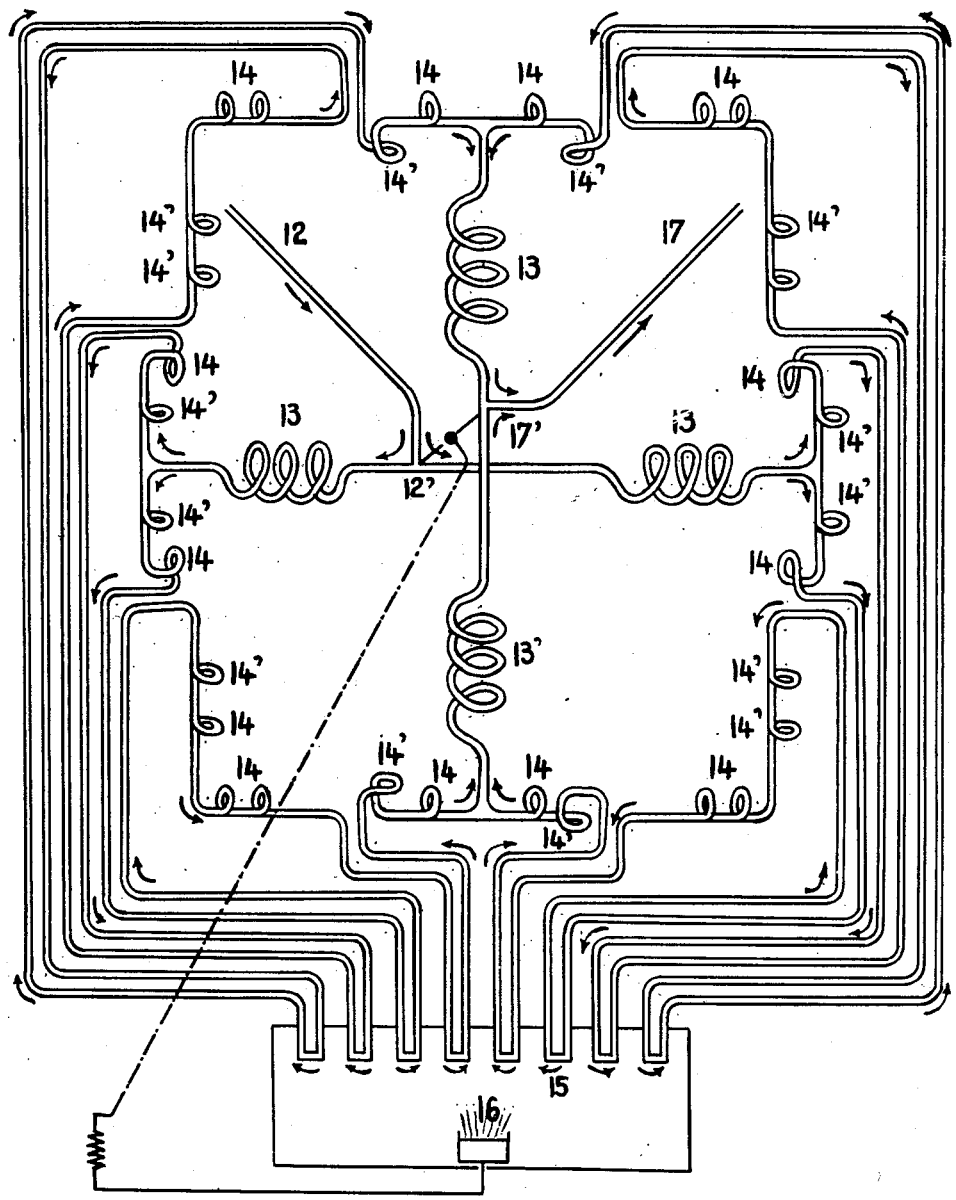

Patented Apr. 24, 1923.

1,452,666

UNITED STATES PATENT OFFICE.

PIERRE MARIE GABRIEL TOULON, OF PARIS, FRANCE, ASSIGNOR TO BUREAU D'ORGANISATION ÉCONOMIQUE, OF PARIS, FRANCE.

DEVICE FOR THE COOLING OF ELECTRIC APPARATUS BY THE CIRCULATION OF LIQUID THROUGH THE CONDUCTORS.

Application filed May 2, 1922. Serial No. 558,031.

*To all whom it may concern:*

Be it known that, PIERRE MARIE GABRIEL TOULON, citizen of the French Republic, residing 106^bis Rue de Rennes, Paris, France, has himself invented certain new and useful Devices for the Cooling of Electric Apparatus by the Circulation of Liquid Through the Conductors, of which the following is a specification.

This invention has for its object to so combine the fluid cooled secondary winding of a transformer with the fluid cooled anodes of a vapor rectifier that the cooling of both the winding and anodes is effected simultaneously.

In the accompanying drawing wherein an approved embodiment of the invention is illustrated:

Fig. 2 illustrates an arrangement for cooling the secondary windings of a transformer having windings in star form and polygonal winding connected together and for cooling the anodes of a rectifying apparatus.

Figure 1:
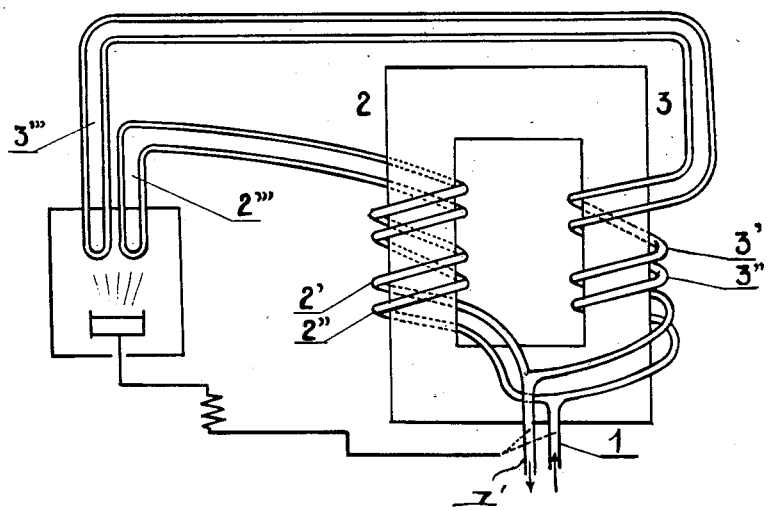
Fig. 1 is a diagrammatic view of an arrangement for cooling the open secondary winding of a single phase transformer and the anodes of a vapor rectifier supplied by the transformer.

In both figures of the drawings, only the secondary windings of the transformers are shown, although it will be understood that in actual practice the secondary windings have associated with them the usual primary windings.

In the arrangement shown in Fig. 1, an ordinary single phase transformer comprises a secondary winding constituted by two coils 1'—2 and 1—3 disposed in parallel. The coils 2 and 3 include, respectively, pairs of hollow copper tubes 2', 2'' and 3', 3'', the tubes of each pair being connected together at one end whereby the cooling fluid entering through the fluid inlet 1 may pass into the other tube and out through the fluid outlet 1'. The two points 1 and 1' at which the cooling fluid enters and leaves the winding are of like potential and hence none of the electricity is carried off by said fluid.

The tubes 2' and 2'' of the coil 2 are connected with one hollow anode 2''' while the tubes 3' and 3'' of the coil 3 are connected with the other anode 3''' of a rectifier. By so connecting the hollow windings with the hollow anodes, the water or other cooling fluid is permitted to circulate through the windings and anodes thereby simultaneously cooling the latter.

Fig. 2 illustrates the arrangement and connections of the hollow conductors for conducting the cooling fluid in a transformer having its secondary windings connected in polygon and star and connected together at a certain number of points. The inlet of the cooling fluid takes place at the tube 12 at the neutral point 12' of the star winding, said fluid flowing into the two branches 13 of the star winding in order to reach the polygonal winding 14. After having passed through the several windings of the transformer the cooling fluid returns through the winding 14' and the branches 13' of the star winding and leaves through the outlet tube 17 which is located at the neutral point 17' electrically connected to the point 12'.

The several windings are extended into and connected with the hollow anodes 15 of a vapor rectifier 16 whereby said anodes are cooled simultaneously with the hollow windings of the transformer.

What I claim is:

1. The combination with a vapor rectifier including a plurality of hollow anodes, a transformer core, a winding inductively related to said core comprising a plurality of hollow conductors having points of like potential, and means for introducing a cooling fluid at such points on said winding, said hollow conductors communicating with said hollow anodes for permitting circulation of cooling fluid through said anodes.

2. The combination with a transformer core, of a winding inductively related thereto, said winding comprising a two-part hollow conductor having a plurality of points of like potential located intermediate its length, a vapor rectifier unit connected between said points of like potential and points of opposite potential on said winding, and common cooling means including said hollow conductor for said transformer and said rectifier.

In witness whereof I have hereunto set my hand.

PIERRE MARIE GABRIEL TOULON.